(12) United States Patent
Fernandez Gonzalez et al.

(10) Patent No.: US 8,273,412 B2
(45) Date of Patent: Sep. 25, 2012

(54) METHOD FOR APPLYING CORROSION PROTECTION LAYERS COMPRISING THIOAMIDES TO METALLIC SURFACES

(75) Inventors: Monica Fernandez Gonzalez, Frankenthal (DE); Markus Hickl, Muenster (DE); Cordula Mock-Knoblauch, Hong Kong Discovery Bay (CN); Manfred Essig, Otterberg (DE); Ingolf Hennig, Neulussheim (DE); Alexander Goethlich, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1407 days.

(21) Appl. No.: 11/815,073

(22) PCT Filed: Jan. 24, 2006

(86) PCT No.: PCT/EP2006/050414
§ 371 (c)(1),
(2), (4) Date: Jul. 30, 2007

(87) PCT Pub. No.: WO2006/079627
PCT Pub. Date: Aug. 3, 2006

(65) Prior Publication Data
US 2008/0131687 A1    Jun. 5, 2008

(30) Foreign Application Priority Data

Jan. 28, 2005 (DE) .................. 10 2005 004 292
Dec. 20, 2005 (DE) .................. 10 2005 061 319

(51) Int. Cl.
*B05D 7/16*    (2006.01)

(52) U.S. Cl. .................. 427/372.2; 427/384; 427/385.5; 427/388.1; 427/388.2; 427/388.4; 427/388.5; 427/421.1; 427/427.4; 427/427.5; 427/430.1; 427/435; 427/428.01

(58) Field of Classification Search ........................ None
See application file for complete search history.

(56) References Cited

U.S. PATENT DOCUMENTS

| 2,201,171 | A | * | 5/1940 | Hanford .................. 558/30 |
| 2,280,578 | A | | 4/1942 | Hanford et al. |
| 2,317,155 | A | * | 4/1943 | Coffman et al. .............. 528/288 |
| 3,687,908 | A | | 8/1972 | Picklesimer |
| 5,322,870 | A | | 6/1994 | Lin |
| 5,470,908 | A | | 11/1995 | Schmidt et al. |
| 6,607,587 | B1 | * | 8/2003 | Kanai et al. ................. 106/14.44 |
| 2008/0171195 | A1 | * | 7/2008 | Gothlich et al. ............. 428/336 |

FOREIGN PATENT DOCUMENTS

| DE | 29 43 833 | 5/1980 |
| DE | 196 32 426 | 2/1999 |

(Continued)

OTHER PUBLICATIONS

U.S. Appl. No. 12/602,599, filed Dec. 1, 2009, Roschmann, et al.

(Continued)

*Primary Examiner* — Erma Cameron
(74) *Attorney, Agent, or Firm* — Oblon, Spivak, McClelland, Maier & Neustadt, L.L.P.

(57) ABSTRACT

Process for applying integrated pretreatment layers to metallic surfaces, particularly the surfaces of coil metals, by treatment with a composition comprising at least one binder, crosslinker, a finely divided inorganic filler, and compounds containing at least two thioamide groups or containing one thioamide group and at least one functional group. Integrated pretreatment layer obtainable by the process.

28 Claims, 1 Drawing Sheet

FOREIGN PATENT DOCUMENTS

Figure 1:
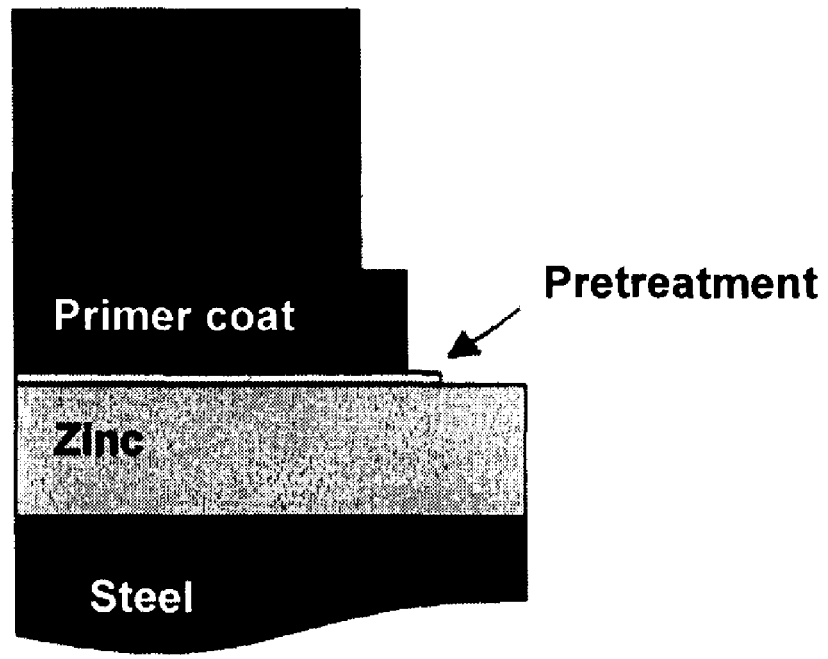

| | | |
|---|---|---|
| DE | 198 35 206 | 2/2000 |
| DE | 199 14 896 | 10/2000 |
| DE | 199 23 084 | 11/2000 |
| EP | 0 878 519 A1 | 11/1998 |
| EP | 0 878 519 B1 | 8/2003 |
| GB | 996 489 | 6/1965 |
| JP | 2000 297384 | 10/2000 |
| JP | 2002 64856 | 2/2002 |
| JP | 2002 241957 | 8/2002 |
| JP | 2003 73856 | 3/2003 |

OTHER PUBLICATIONS

M. Oezcan, et al., "Electrochemical and Quantum Chemical Studies of Some Sulphur-Containing Organic Compounds As Inhibitors for the Acid Corrosion of Mild Steel", Progress in Organic Coatings, vol. 51, No. 3, pp. 181-187, 2004.

Johan Bieleman, "Lackadditive", Wiley-VCH, Weinheim, New York, 1998.

Roempp Lexikon, "Lacke Und Druckfarben", Georg Thieme Verlag, Stuttgart, New York, 1998.

* cited by examiner

METHOD FOR APPLYING CORROSION PROTECTION LAYERS COMPRISING THIOAMIDES TO METALLIC SURFACES

The present invention relates to a process for applying corrosion control layers, in particular, integrated pretreatment layers, to metallic surfaces, particularly the surfaces of coil metals, by treatment with a composition comprising at least one binder, crosslinker, a finely divided inorganic filler, and compounds containing at least two thioamide groups or containing one thioamide group and at least one functional group. It also relates to an integrated pretreatment layer obtainable by the process.

For producing sheetlike metallic workpieces such as, for example, automobile parts, bodywork parts, instrument casings, exterior architectural facings, ceiling panels or window profiles, suitable metal sheets are shaped by means of appropriate techniques such as punching, drilling, folding, profiling and/or deep drawing. Larger components, such as automobile bodies, for example, are assembled if appropriate by welding together a number of individual parts. The raw material for this purpose normally comprises long metal strips which are produced by rolling the metal and which for the purposes of storage and transportation are wound up to form what are called coils.

The metallic components referred to must in general be protected against corrosion. In the automotive segment in particular the requirements in terms of corrosion control are very high. Newer models of automobile are nowadays being warranted for up to 30 years against rust perforation. Modern automobile bodies are produced in multistage operations and have a multiplicity of different layers.

Whereas in the past the corrosion control treatment was essentially carried out on the finished metallic workpiece—an automobile body assembled by welding, for example—in more recent times the corrosion control treatment has increasingly been performed on the coil metal itself, by coil coating.

Coil coating is the continuous coating of metal strips, or coils, with usually liquid coating materials. Metal coils with a thickness of from 0.2 to 2 mm and a width of up to 2 m are transported at a speed of up to 200 m/min through a coil-coating plant, and in the process are coated. For this purpose it is possible to use, for example, cold-rolled strips of soft steels or construction-grade steels, electrolytically galvanized thin sheet, hot-dip-galvanized steel coil, or coils of aluminum and/or aluminum alloys. Typical plants comprise a feed station, a coil store, a cleaning and pretreatment zone, a first coating station along with baking oven and downstream cooling zone, a second coating station with oven, laminating station, and cooling, and a coil store and winder.

The coil coating operation normally comprises the following process steps:
1. If necessary: cleaning of the metal strip to remove contamination accumulated during the storage of the metal strip, and to remove temporary corrosion control oils, by means of cleaning baths.
2. Application of a thin pretreatment layer (<1 μm) by a dipping or spraying process or by roller application. The purpose of this layer is to increase the corrosion resistance, and it serves to improve the adhesion of subsequent coating layers to the metal surface. Known for this purpose are both Cr(VI)-containing and chromate-free pretreatment baths.
3. Application of a primer by a roller application method. The dry layer thickness is normally about 5-8 μm. Solvent-based coating systems are used in this case.
4. Application of one or more topcoat layers by a roller application method. The dry layer thickness in this case is about 15-25 μm. Here again, solvent-based coating systems are employed.

The layer construction of a galvanized steel panel coated in this way is depicted in FIG. 1. It shows a section through a steel coil (1) which has been provided with a zinc layer (2) and to which a conventional pretreatment layer (3), a primer (4), and a topcoat (5) have been applied.

Metal coils thus coated are used, for example, to produce casings for what are known as white goods (refrigerators, etc.), as facing panels for buildings, or else in automaking.

As depicted above, the coating of the metal coils with the pretreatment layer (3) and a primer (4) is very laborious. Moreover, within the market, there is continually increasing demand for Cr(VI)-free systems for corrosion control. There has therefore been no lack of attempts to replace the separate application of a pretreatment layer (3) and the organic primer coating (4) by the application of a single, integrated pretreatment layer (3') which takes on the functions of both layers. A layer structure of such a kind is shown by way of example and diagrammatically in FIG. 2. The production of a coated metal coil will be significantly simplified as a result of such a one-stage operation.

U.S. Pat. No. 5,322,870 discloses a composition for forming an integrated pretreatment layer, comprising a polymeric coating material, a crosslinker, and, in addition, alkyl- or arylphosphoric esters and/or alkyl- or arylphosphonic esters. The composition may optionally also comprise a pigment.

DE-A 199 23 084 discloses a chromium-free aqueous coating material for one-stage coating, the material comprising at least hexafluoro anions of Ti(IV), Si(IV) and/or Zr(IV), a water-soluble or water-dispersible film-forming binder, and an organophosphoric acid. The composition may optionally also comprise a pigment and crosslinking agents.

DE-A 29 43 833 discloses the use of thiourea and derivatives thereof as additives in an aqueous conversion coating composition comprising free sulfuric acid, hydrogen peroxide, and silicon dioxide.

EP-A 878 519 discloses preferably chromium-free, aqueous compositions for producing corrosion control coatings, comprising from 0.2 to 50 g/l of a thiocarbonyl compound, from 0.1 to 5 g/l of phosphates, and also water-soluble binders or binder dispersions. From 10 to 500 g/l of $SiO_2$ may optionally be present. The thiocarbonyl compounds may be, for example, thiourea, thioamides, thioaldehydes or thiocarboxylic acids. Thioamides containing more than one thioamide group are not disclosed.

JP-A 2002-64856, JP-A 2002-241957, JP-A 297384 and JP-A 2003-73856 disclose various kinds of aqueous compositions for producing corrosion control coatings, comprising different aqueous polymer dispersions, further components, and also thiocarbonyl compounds, such as, for example, thiourea or ethanethioamide. Thioamides containing more than one thioamide group are not disclosed.

It was an object of the invention to provide an improved process for applying corrosion control layers to metallic surfaces, in particular for producing integrated pretreatment layers, and also improved integrated pretreatment layers themselves.

Accordingly a process has been found for applying corrosion control layers to metallic surfaces, the metallic surface being treated with a formulation at least comprising a binder, a pigment and/or a filler and also a corrosion preventive agent, wherein said corrosion preventive agent is at least one compound containing thioamide groups (I) —$C(S)NR^1R^2$ and selected from the group of (D1) thioamides of the general formula (II) $R^4{}_n—R^3—C(S)NR^1R^2$, and (D2) thioamides containing at least 2 thioamide groups, n being a natural number from 1 to 5 and the radicals $R^1$, $R^2$, $R^3$ and $R^4$ having the following definitions:

$R^1$ and $R^2$ each independently are H or a linear or branched, optionally substituted alkyl radical having 1 to 20 carbon atoms, $R^3$ is an (n+1)-valent hydrocarbon radical having 1 to 30 carbon atoms, and $R^4$ is a functional group.

In one particularly preferred embodiment of the invention the corrosion preventive layer is an integrated pretreatment layer.

In a second aspect of the invention integrated pretreatment layers, preferably with a thickness of from 3 to 15 μm on metallic surfaces, have been found which are obtainable by the process.

In a third aspect of the invention a formulation for implementing the process has been found, comprising the above-mentioned thioamides.

In a fourth aspect of the invention polymeric thioamides have been found.

LIST OF FIGURES

FIG. 1: Section through a galvanized steel coil with two-stage pretreatment

Figure 2:
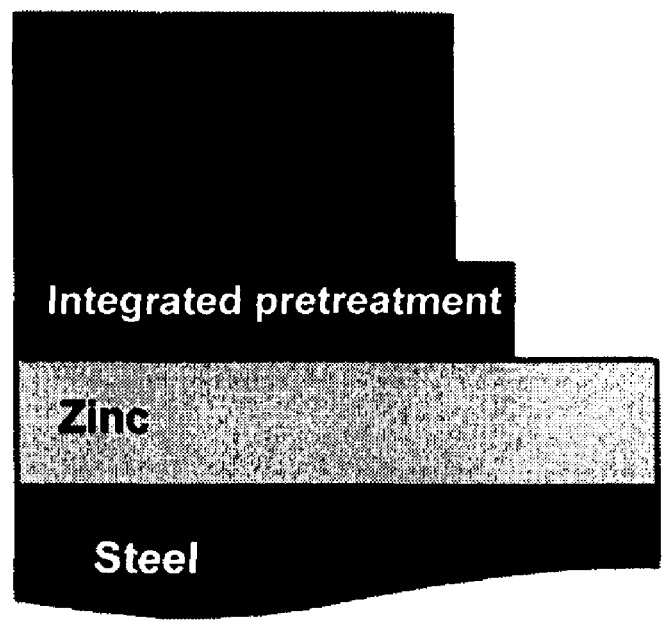

FIG. 2: Section through a galvanized steel coil with integrated pretreatment.

DETAILS OF THE INVENTION NOW FOLLOW

By means of the process of the invention it is possible in principle to protect any metallic bodies against corrosion.

In one embodiment of the inventive the metallic bodies can be stationary metallic structures such as, for example, buildings, bridges, power masts, oil tanks, pipelines, power stations or chemical plant. In the case of this embodiment, corrosion control coatings are typically applied by painting or spraying on site. Corrosion control coatings of this kind are dried and cured under atmospheric conditions, in other words at ambient temperature, and in the presence of air and typical atmospheric humidity. Depending on the degree of protection required, the protection of surfaces against corrosion by means of corrosion control coatings is also referred to as light, medium, and heavy duty corrosion control.

In a further embodiment of the invention it is possible with particular advantage to provide flat metallic structures such as panels, foils, sheets, and, in particular, metal coils with an integrated pretreatment layer. Layers of this kind are produced preferably by means of coil coating. Drying and curing are typically performed at relatively high temperatures, such as in appropriate ovens, or else may be performed photochemically using suitable radiation sources.

As far as the nature of the metal is concerned, any desired metals may be involved in principle. In particular, however, the metals or alloys involved are those which are commonly employed as metallic construction materials and require protection against corrosion.

The surfaces in question are in particular those of iron, steel, Zn, Zn alloys, Al or Al alloys. They may be the surfaces of structures composed entirely of said metals and/or alloys. Alternatively they may be the surfaces of structures only coated with these metals and may themselves be composed of other materials: other metals, alloys, polymers or composites, for example. The surface in question may in particular be that of galvanized iron or steel. In one preferred embodiment of the process it is the surface of a coil metal, in particular electrolytically galvanized or hot-dip-galvanized steel. The metal coil in question may be galvanized on one side or on both sides. Zn alloys or Al alloys are known to the skilled worker. The skilled worker selects the identity and amount of alloying constituents in accordance with the desired end application. Typical constituents of zinc alloys comprise in particular Al, Pb, Si, Mg, Sn, Cu or Cd. Typical constituents of aluminum alloys comprise in particular Mg, Mn, Si, Zn, Cr, Zr, Cu or Ti. The alloys in question can also be Al/Zn alloys in which Al and Zn are present in approximately equal amounts. Steel coated with such alloys is available commercially. The steel may comprise the customary alloying components known to the skilled worker.

The term "integrated pretreatment layer" for the purposes of this invention means that the coating of the invention is applied directly to the metal surface without any corrosion-inhibiting pretreatment such as passivating or phosphating, in particular treatment with Cr(VI) compounds, being carried out beforehand. The integrated pretreatment layer combines the passivating layer with the organic primer in a single layer. The term "applied directly", however, does not rule out the possibility of a thin layer, in particular a thin oxide skin, being present on the metal surface, such a layer forming unavoidably in normal operation with the metal in the presence of air.

Atop the integrated pretreatment layer it is possible with advantage for further coating layers, such as cathodic electrocoat materials, for example, to be applied directly without the need for an additional organic primer to be applied beforehand. It will be appreciated, however, that an additional organic primer is possible in special cases, though preferably is absent.

The formulation employed in accordance with the invention for applying corrosion control layers to metallic surfaces comprises at least one binder. This binder may optionally also contain crosslinkable groups. The skilled worker is aware of binders for corrosion control paints and coatings.

The formulation used in accordance with the invention for applying integrated pretreatment layers comprises at least one binder (A) and also crosslinkable components (B). The crosslinkable components may comprise at least one crosslinker, which is used in addition to a binder, or may comprise crosslinkable groups which are connected to the binder. It will be appreciated that the binder may also contain crosslinkable groups and that a crosslinker may be used additionally.

A variety of possible combinations arise here. By way of example, binder and crosslinker can be used separately from one another. In that case the binder includes reactive functional groups which are able to react with complementary reactive functional groups in the crosslinkers. Alternatively the binders may also be self-crosslinking binders, comprising reactive functional groups which are able to enter into crosslinking reactions with groups of their own kind ("with themselves") or with complementary reactive functional groups on the same polymer. It is also possible for exclusively the crosslinkers to react with one another.

The binders (A) can be the binders customary in the field of coil coating materials. Examples of suitable binders include (meth)acrylate (co)polymers, partially hydrolyzed polyvinyl esters, polyesters, alkyd resins, polylactones, polycarbonates, polyethers, epoxy resin-amine adducts, polyureas, polyamides, polyimides or polyurethanes. It will be appreciated that mixtures of different polymers can also be used, provided the mixture does not give rise to any unwanted effects.

Preference is given to using polyesters or epoxy resin-amine adducts. The polyesters are suitable particularly for weldable coating materials and the epoxy resin-amine adducts are preferred for coating materials which are not to be welded.

Suitable polyesters include in particular condensates of low molecular mass dicarboxylic acids and dialcohols. Examples of suitable dicarboxylic acids comprise aliphatic dicarboxylic acids such as adipic acid, azelaic acid, sebacic acid and dodecanedioic acid, aliphatically cycloaliphatic acids such as dimer fatty acids, i.e., reaction products of unsaturated fatty acids with one another, cycloaliphatic dicarboxylic acids such as 1,4- or 1,3-cyclohexanedicarboxylic acid and tricyclodecanedicarboxylic acid, and aromatic dicarboxylic acids such as isophthalic acid, terephthalic acid or phthalic acid. As will be appreciated, it is also possible to use derivatives of dicarboxylic acids. Particularly suitable are anhydrides such as phthalic anhydride, hexahydrophthalic anhydride or tetradehydrophthalic anhydride, for example.

Examples of suitable dialcohols comprise aliphatic alcohols such as ethylene glycol, diethylene glycol, triethylene glycol, propylene glycol, 1,3-butanediol, 1,3-propanediol, 1,4-butanediol, neopentylglycol, 1-methylpropane-1,3-diol, 2-butyl-2-ethylpropanediol, pentanediols, hexanediols, octanediols, dodecanediol, neopentylglycol hydroxypivalate, cycloaliphatic alcohols such as 1,4- or 1,3-cyclohexanedimethanol, TCD alcohol and bis(4-hydroxycyclohexyl)methane and/or -propane, and dimer diols (hydrogenated dimer fatty acids). As will be appreciated, it is also possible in a known way to use derivatives of alcohols, such as esters, for example, especially the corresponding methyl or ethyl esters.

Besides linear binders it is also possible to use branched binders. Suitable monomers for producing branches comprise tricarboxylic acids or their anhydrides such as trimellitic anhydride or trimesic acid and trialcohols such as trimethylolalkanes, an example being trimethylolethane or trimethylolpropane.

With preference it is possible to convert the polyesters to isocyanate-terminated polyesters, in whole or in part, by reaction with polyisocyanates.

The OH number of the polyesters used is usually from about 10 to about 200 mg KOH/g, preferably from 15 to 120 mg KOH/g, more preferably from 20 to 80 mg KOH/g and for example about 50 mg KOH/g. The molecular weights are usually from 400 to 10 000 g/mol, preferably from 500 to 5000 g/mol and more preferably from 1000 to 4000 g/mol.

Epoxy-functional polymers can be prepared by reacting epoxy-functional monomers such as bisphenol A diglycidyl ether, bisphenol F diglycidyl ether or hexanediol diglycidyl ether with phenols such as bisphenol A, bisphenol F and/or alcohols such as ethoxylated or propoxylated bisphenol A. Epoxy-functional polymers are available commercially, under the name Epon® or Epikote®, for example.

Epoxy resin-amine adducts can be obtained by reacting said epoxy-functional components with phenols and/or with aliphatic or cycloaliphatic dicarboxylic acids, acidic polyesters or alcohols, thiols and also amines, particularly secondary amines such as diethanolamine or N-methylbutanolamine, for example.

It is additionally possible to use emulsion polymers as well. These polymers are particularly suitable for water-based formulations. Examples of suitable emulsion polymers or copolymers comprise acrylate dispersions, obtainable in conventional manner from acrylic acid and/or acrylic acid derivatives, examples being acrylic esters, and/or styrene. Dispersions of polyurethanes are suitable as well, prepared from aromatic and/or aliphatic diisocyanates and polyesters or aliphatic soft segments.

The formulation employed generally comprises from 20 to 70% by weight of the binder. The stated quantities refer to the sum of all of the components of the formulation bar the solvent or solvent mixture. Preferably the amount is from 30 to 60% by weight and more preferably from 40 to 50% by weight.

The crosslinking components (B) may have thermally crosslinking groups or photochemically crosslinking groups.

Suitable thermal crosslinkers are, for example, crosslinkers based on epoxides, in which two or more epoxy groups are joined to one another by means of a linking group. Examples comprise low molecular mass compounds having two epoxy groups such as hexanediol diglycidyl ether, phthalic acid diglycidyl ether or cycloaliphatic compounds such as 3,4-epoxycyclohexylmethyl 3',4'-epoxycyclohexanecarboxylate. Other examples of suitable crosslinkers comprise melamine-based crosslinkers.

Particular preference is given to using blocked polyisocyanate crosslinkers. On blocking, the isocyanate group is reacted reversibly with a blocking agent. On heating to higher temperatures, the blocking agent is eliminated again. Examples of suitable blocking agents are disclosed in DE-A 199 14 896, column 12 line 13 to column 13 line 2. Particular preference is given to using polyisocyanates blocked with ε-caprolactam.

Crosslinkers suitable for photochemical crosslinking are, in particular, compounds containing two or more ethylenically unsaturated groups, especially difunctional or polyfunctional acrylates such as, for example, butanediol diacrylate, hexanediol diacrylate or trimethylolpropane triacrylate.

If a crosslinker is used separately it is usual to use from 0.5 to 10% by weight, preferably from 1 to 8% by weight and more preferably from 2 to 6% by weight. It will be appreciated that mixtures of different crosslinkers can also be used, provided that the properties of the layer are not adversely affected as a result.

The formulation used for the process of the invention for applying corrosion control layers further comprises at least one pigment and/or one filler. The fillers/pigments in question are preferably those whose average particle size does not exceed 10 μm. The substance in question may in particular be at least one anticorrosion pigment. Suitable anticorrosion pigments are known to the skilled worker and are described below.

The formulation used for the preferred process of the invention for applying integrated pretreatment layers further comprises at least one finely divided inorganic filler or a pigment (C). The fillers or pigments may also comprise an additional organic coating, for hydrophobicizing or hydrophilicizing, for example. The filler ought not to exceed an average particle size of 10 μm. With preference the average particle size amounts to 10 nm to 9 μm and more preferably 100 nm to 5 μm. In the case of round or approximately round particles this figure refers to the diameter; in the case of particles of irregular shape, such as with needle-shaped particles, for example, it refers to the longest axis. By particle size is meant the primary particle size. The skilled worker is aware, of course, that finely divided solids frequently undergo agglomeration to larger particles, which for use must be dispersed intensively. The particle size is selected by the skilled worker in accordance with the desired properties of the layer. It is guided, for example, by the desired layer thickness as well. As a general rule, the skilled worker will select smaller particles for a low layer thickness.

Suitable fillers include on the one hand electrically conductive pigments and fillers. Additives of this kind serve to improve the weldability and to improve subsequent coating with electrocoat materials. Examples of suitable electrically conducting fillers and pigments comprise phosphides, vanadium carbide, titanium nitride, molybdenum sulfide, graphite, carbon black or doped barium sulfate. Preference is given to using metal phosphides of Zn, Al, Si, Mn, Cr, Fe or Ni, in particular iron phosphides. Examples of preferred metal phosphides comprise CrP, MnP, $Fe_3P$, $Fe_2P$, $Ni_2P$, $NiP_2$ or $NiP_3$.

It is also possible to use nonconducting pigments or fillers, such as finely divided amorphous silicon, aluminum or titanium oxides, for example, which may also have been doped with further elements. As an example it is possible to use amorphous silica modified with calcium ions.

Further examples of pigments comprise anticorrosion pigments such as zinc phosphate, zinc metaborate or barium metaborate monohydrate.

It will be appreciated that mixtures of different pigments can also be used. The pigments are normally used in an amount of from 20 to 70% by weight. The precise amount is determined by the skilled worker in accordance with the desired properties of the layer. When using conductivity pigments the amounts employed are normally greater than when using nonconducting fillers. Preferred amounts in the case of conductive pigments and fillers are from 40 to 70% by weight; preferred amounts in the case of nonconductive pigments are from 20 to 50% by weight.

The formulation employed inventively for the application of corrosion control layers, preferably for the application of integrated pretreatment layers, further comprises at least one compound containing thioamide groups (I) —$C(S)NR^1R^2$.

$R^1$ and $R^2$ in this formula are independently of one another H or a linear or branched, optionally substituted alkyl radical having 1 to 20 carbon atoms, preferably 1 to 10 carbon atoms and more preferably 1 to 6 carbon atoms. Additional substituents may be, in particular, oxygen- or nitrogen-containing substituents: for example, OH groups or $NH_2$ groups. Moreover, in radicals having at least 3 carbon atoms, nonadjacent, nonterminal carbon atoms may be replaced by O and/or N atoms. Examples of preferred radicals $R^1$ and $R^2$, respectively, comprise methyl, ethyl, n-propyl, isopropyl, n-butyl, isobutyl, tert-butyl, n-pentyl and n-hexyl groups. With preference at least one of the radicals $R^1$ and $R^2$ is H and more preferably both radicals are H.

The thioamides employed inventively are compounds (D1) of the general formula (II) $R^4{}_n$—$R^3$—$C(S)NR^1R^2$, which contain a thioamide group and also one or more functional groups, or are compounds (D2), which contain at least two thioamide groups.

In the compounds (D1) the thioamide group is linked via the (n+1)-valent hydrocarbon radical $R^3$ to n functional groups $R^4$, n being a natural number from 1 to 5. Preferably n is 1 to 3 and more preferably it is 1 or 2.

$R^3$ is preferably an (n+1)-valent aliphatic, cycloaliphatic, aromatic or araliphatic hydrocarbon radical having 1 to 30 carbon atoms, preferably 1 to 20 carbon atoms and more preferably 1 to 10 carbon atoms. For the skilled worker it is self-evident that the values of n which are possible in principle are also guided by the number of carbon atoms. As a general rule, there is on average not more than one functional group present per carbon atom of the hydrocarbon radical $R^3$. Attached to the radical $R^3$ are the thioamide group, on the one hand, and also n functional groups $R^4$. These functional groups can be of the same kind or else may be different kinds of functional groups.

The functional groups $R^4$ may be, for example, —OH, —$NH_2$, —$NHR^5$, —$NR^5R^5$, —COOH, —$COOR^5$, —$CONH_2$, —$CONHR^5$, —$CONR^5R^{5'}$, —$NHCOR^5$, —$NR^{5'}COR^5$, —$NHCONHR^5$, —SH, —CN, —$Si(OH)_2$, —$PO(OH)_3$, —$Si(OR^5)_2$, —$PO(OR^5)_3$, $R^5$ and $R^{5'}$ independently of one another, each being an alkyl radical, preferably a straight-chain or branched alkyl radical having 1 to 6 carbon atoms, and more preferably —$CH_3$.

In one preferred embodiment of the invention the functional groups $R^4$ are groups containing only N and/or O atoms as heteroatoms. Examples of such groups comprise —OH, —$NH_2$, —$NHR^5$, —$NR^5R^{5'}$, —COOH, —$COOR^5$, —$CONH_2$, —$CONHR^5$, —$CONR^5R^{5'}$, —$NHCOR^5$, —$NR^{5'}COR^5$, and —$NHCONHR^5$.

With particular preference the functional group is —OH and/or —$NH_2$.

In one preferred embodiment of the invention the radical $R^3$ is a divalent hydrocarbon radical; i.e., in this case, n is 1. In this case mention may be made in particular of linear 1,ω-alkylene radicals of the general formula —$(CH_2)_k$—, k being a natural number from 1 to 30, preferably from 1 to 20 and more preferably from 1 to 10. It may also comprise divalent aromatic radicals, such as 1,4-phenylene, for example, or may be substituted aromatic radicals of the general formula —$(CH_2)_{k'}$—$(C_6H_4)$— or —$(CH_2)_{k'}$—$(C_6H_4)$—$(CH_2)_{k''}$—, k' and k'' independently of one another being a natural number from 1 to 10, preferably from 1 to 3.

Examples of particularly preferred thioamides (D1) comprise ω-hydroxycarboxylic thioamides of the general formula HO—$(CH_2)_k$—$C(S)NR^1R^2$, the radicals and indices being defined as indicated above. k in these compounds is preferably 3 to 8. Examples of such compounds comprise 2-hydroxythioacetamide, 3-hydroxythiopropionamide, 4-hydroxythiobutanamide, 5-hydroxythiopentanamide, 7-hydroxythioheptanamide or 8-hydroxythiooctanamide, 9-hydroxythiononamide or 10-hydroxythiodecanamide.

The compounds (D2) containing at least two thioamide groups may at their most simple be dithiooxamide $R^1R^2N(S)C$—$C(S)NR^1R^2$.

Apart from these, the compounds in question are compounds of the general formula $R^6(—C(S)NR^1R^2)_m$, in which m thioamide groups are joined to one another by a linking group $R^6$, and m is a natural number of at least two. The compounds can be low molecular mass compounds, oligomeric compounds or polymeric compounds. The linking group $R^6$ comprises straight-chain or branched aliphatic, cycloaliphatic, aromatic and/or araliphatic hydrocarbon radicals, in which it is also possible for nonadjacent carbon atoms to be substituted by heteroatoms, in particular O and/or N atoms, or by functional groups, and which additionally may also further contain functional groups. Additional functional groups can in particular be the groups $R^4$ defined above.

In one preferred embodiment of the invention D2 comprises low molecular mass compounds. $R^6$ in this case has 1 to 30 carbon atoms, preferably 2 to 20 carbon atoms and more preferably 2 to 10 carbon atoms, and m in these compounds has a value of from 2 to 6, preferably from 2 to 4 and more preferably 2.

In one particularly preferred embodiment (D2) is a thioamide of the general formula (III) $R^1R^2N(S)C$—$R^7$—$C(S)NR^1R^2$. $R^7$ in such a compound is a divalent linking group comprising 1 to 30 carbon atoms.

$R^7$ comprises, in particular, linear 1,ω-alkylene radicals of the general formula —$(CH_2)_k$—, k being a natural number from 1 to 30, preferably from 2 to 20 and more preferably from 2 to 8. It may also comprise divalent aromatic radicals, such as 1,4-phenylene, for example, or substituted aromatic radicals of the general formula —(CH$_2$)$_{k'}$—(C$_6$H$_4$)— or —(CH$_2$)$_{k'}$—(C$_6$H$_4$)—(CH$_2$)$_{k''}$—, k' and k" independently of one another being a natural number from 1 to 10, preferably from 1 to 3.

Examples of such compounds D2 comprise malonyldithioamide, hexanedithioamide, 1,4-benzodithioamide or 1,2-benzodithioamide.

R$^7$ can with further preference comprise radicals of the general formula —(CH$_2$)$_{k'}$—R$^8$—(CH$_2$)$_{k''}$—, R$^8$ being a divalent functional group, in particular a functional group containing P. Examples of such groups comprise —OP(O)(OR$^9$)O—, —P(O)(OR$^9$)—, —P(S)(OR$^9$)—, —P(S)(SR$^9$), in which R$^9$ is H, a monovalent metal ion or an alkyl radical, preferably a straight-chain or branched alkyl radical having 1 to 6 carbon atoms.

The preparation of compounds containing thioamide groups is known to the skilled worker. They may be prepared, for example, from the corresponding nitriles by reaction with H$_2$S.

In another preferred embodiment of the invention (D2) is a polymer which comprises at least two terminal and/or pendant thioamide groups. The term "polymer" includes oligomers and comprises, in conventional manner, compounds of high molecular mass which are obtained starting from one or more monomers by polymerization. The polymers in question may be substantially linear polymers or else branched polymers. The average molar mass M$_n$ of the polymers containing thioamide groups is normally from 300 to 10 000 000 g/mol, preferably from 500 to 1 000 000 g/mol and more preferably from 1000 to 100 000 g/mol.

The thioamide groups on the polymer may be terminal groups or may be pendant groups. Pendant thioamide groups may be sited directly on the polymer main chain, or may also be connected to the polymer main chain via a spacer.

The polymers can be prepared by first preparing polymers containing nitrile groups and, after the polymerization, reacting the nitrile groups with H$_2$S, in a way which is known in principle, to give thioamide groups. This is shown diagrammatically below for a polymer containing an acrylonitrile unit (scheme (I)).

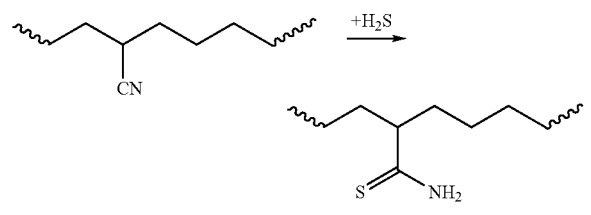

As starting material for the reaction it is possible in principle to use all kinds of homopolymers or copolymers which contain nitrile groups. The only restriction on the selection is that, in the reaction of H$_2$S with the polymer, there should be no adverse effects as a result of unwanted secondary reactions. Examples of suitable monomers for synthesizing polymers containing nitrile groups comprise α,ω-ethenylcarbonitriles, such as acrylonitrile, allylnitrile, butenenitrile, pentenenitrile or hexenenitrile, for example, (meth)acrylamides of the general formula H$_2$C=C(CH$_3$)CONH—R$^{10}$—CN or (meth)acrylic esters of the general formula H$_2$C=C(CH$_3$)COO—R$^{10}$—CN, where R$^{10}$ is in each case a divalent hydrocarbon radical. Preference is given to acrylonitrile.

Examples of suitable comonomers comprise olefins, preferably vinylaromatic compounds such as styrene, α-methylstyrene or substituted styrenes, and also, furthermore, (meth) acrylic acid or (meth)acrylic esters such as, for example, methyl (meth)acrylate, ethyl(meth)acrylate, butyl(meth) acrylate or 2-ethylhexyl acrylate. Preferred starting materials for performing the present invention are, for example, copolymers of styrene and acrylonitrile.

The reaction of the nitrile group with H$_2$S can be performed advantageously in the presence of a base. It can performed, for example, using a pressure apparatus and also using methanol as solvent. The degree of conversion can be determined, for example, by means of $^{13}$C-NMR spectroscopy, by comparison of the intensity of the CN and CSNH$_2$ signals, and ought in general to be 20% to 100%, preferably 40% to 100%.

A further possibility is to use monomers for the polymerization which additionally contain reactive groups which are able to react with suitable compounds containing thioamide groups. As an example, mention may be made of polymers which contain maleic anhydride groups and which can be reacted, for example, with ω-hydroxy thioamides or ω-amino trioamides, as shown exemplarily below in schemes (II) and (III).

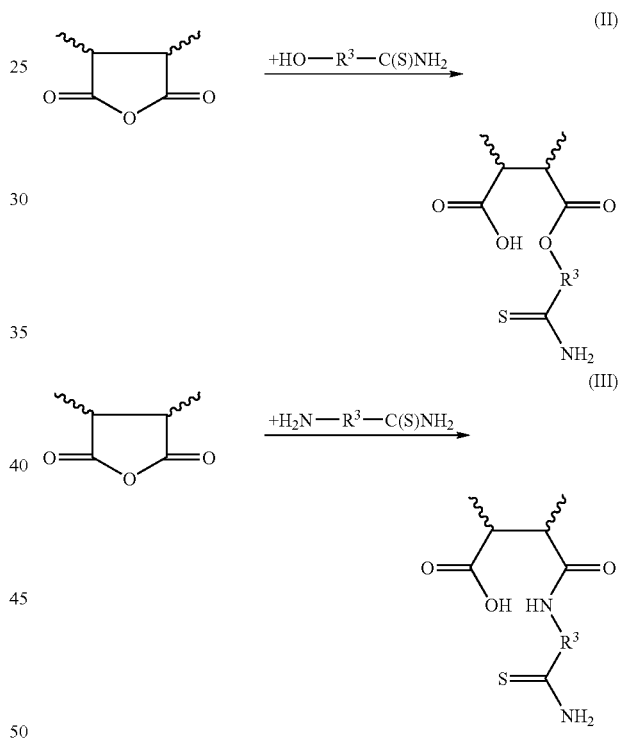

Polymers which have proven suitable include, for example, copolymers of maleic anhydride and comonomers such as (meth)acrylic acid, (meth)acrylates, vinyl ethers and/or olefins as starting material for the modification. For example, the copolymers in question may be styrene-maleic anhydride copolymers.

The corrosion control layers, in particular the integrated pretreatment layers, may be prepared using a single thioamide or else two or more different thioamides D1 and/or D2. From among the thioamides that are possible in principle, the skilled worker makes a specific selection in accordance with the desired properties of the integrated pretreatment layer. For the skilled worker it is self-evident that not all kinds of thioamides D1 and/or D2 are of equal suitability for all kinds of binder systems, solvent systems or surfaces. Through the selection of defined functional groups or the linking group it is possible to tailor the thioamides optimally to particular systems. For example, compounds D1 and/or D2 that tend to be more hydrophilic or more hydrophobic can be prepared for specific use in aqueous coating systems or in organic coating systems, respectively.

It is possible, of course, to use the inventively employed thioamides D1 and/or D2 in a mixture with other thioamides, deviating from the above definition, with other thiocarbonyl compounds, or, generally, with other corrosion preventatives, provided that no negative properties arise. As a general rule, the fraction of the thioamides employed inventively ought to amount to at least 50% by weight, preferably at least 75% by weight, with respect to the total amount of all organic corrosion preventatives employed. With particular preference only thioamides D1 and/or D2 are employed.

The thioamides employed inventively are normally used in an amount of from 0.25 to 10% by weight, preferably from 0.5 to 8% by weight and more preferably from 1 to 6% by weight.

As component (E) the formulation of the invention generally comprises a suitable solvent, in which the components are in solution and/or dispersion, in order to allow uniform application to the surface. It is also possible in principle, however, to make the formulation solvent-free or essentially solvent-free, as a powder coating material. The use of a solvent is preferred.

Suitable solvents are those capable of dissolving, dispersing, suspending or emulsifying the compounds of the invention. They may be organic solvents or water. As will be appreciated, mixtures of different organic solvents or mixtures of organic solvents with water can also be used. Among the solvents possible in principle, the skilled worker makes an appropriate selection in accordance with the desired end use and with the identity of the compound of the invention used.

Examples of organic solvents comprise hydrocarbons such as toluene, xylene or mixtures such as are obtained in the refining of crude oil, such as, for example, defined-boiling-range hydrocarbon fractions, ethers such as THF or polyethers such as polyethylene glycol, ether alcohols such as butylglycol, ether glycol acetates such as butylglycol acetate, ketones such as acetone, and alcohols such as methanol, ethanol or propanol.

In addition it is also possible to use formulations which comprise water or a predominantly aqueous solvent mixture. By this are meant those mixtures which comprise at least 50% by weight, preferably at least 65% by weight and more preferably at least 80% by weight of water. Further components are water-miscible solvents. Examples comprise monoalcohols such as methanol, ethanol or propanol, higher alcohols such as ethylene glycol or polyether polyols and ether alcohols such as butylglycol or methoxypropanol.

The amount of the solvents is selected by the skilled worker in accordance with the desired properties of the formulation and with the desired application method. As a general rule the weight ratio of the layer components to the solvent is from 10:1 to 1:10, preferably about 2:1, without any intention that the invention should be restricted thereto. It is, of course, also possible first to prepare a concentrate and only to dilute it to the desired concentration when on site.

The formulation is prepared by intensively mixing the components of the formulation with the solvents. Suitable mixing or dispersing equipment is known to the skilled worker.

In addition to components (A) to (D) and also, optionally, (E), the formulation may further comprise one or more auxiliaries and/or additives (F). The purpose of such auxiliaries and/or additives is to fine-tune the properties of the layer. Their amount generally does not exceed 20% by weight of the sum of all the components bar the solvents, and preferably does not exceed 10%.

Examples of suitable additives are color and/or effect pigments, reactive diluents for the thermal cure or the actinic radiation cure, Theological assistants, UV absorbers, light stabilizers, free-radical scavengers, free radical addition polymerization initiators, thermal crosslinking catalysts, photoinitiators and photocoinitiators, slip additives, polymerization inhibitors, defoamers, emulsifiers, devolatilizers, wetting agents, dispersants, adhesion promoters, leveling agents, film-forming auxiliaries, rheology control additives (thickeners), flame retardants, siccatives, antiskinning agents, other corrosion inhibitors, waxes, and flatting agents, such as are known from the textbook "Lackadditive" [Additives for coatings] by Johan Bieleman, Wiley-VCH, Weinheim, N.Y., 1998, or from German patent application DE 199 14 896 A 1, column 13 line 56 to column 15 line 54.

Preferred additives are dibutyltin dilaurate as a catalyst for thermal crosslinking.

To implement the process of the invention the metallic surface is treated with the formulation.

In light, medium or heavy duty corrosion control this can be accomplished by means, for example, of sprayed application or painting, the coat being subsequently cured under atmospheric conditions. It is of course also possible to apply two or more coatings, identical or different in composition, in succession. The overall thickness of corrosion control coatings of this kind is determined by the skilled worker in accordance with the desired properties of the corrosion control layer. It amounts in general to at least 15 µm, preferably at least 25 µm. The upper limit for the overall layer thickness, i.e., the thickness of all applied corrosion control layers together, amounts to 2 mm, preferably less than 1.5 mm, more preferably less than 1 mm, very preferably less than 800 µm, and in particular less than 500 µm.

Integrated corrosion control layers are typically applied by means of coil coating. For the integrated corrosion control the surface can optionally be cleaned prior to treatment. Where the treatment of the invention takes place immediately after a metallic surface treatment, such as an electrolytic galvanization or a hot dip galvanization of steel coils, then the coils may generally be contacted with the treatment solution of the invention without prior cleaning. Where, however, the metal coils for treatment have been stored and/or transported prior to the coating in accordance with the invention, they generally carry corrosion prevention oils or at least are soiled to an extent such that cleaning is required prior to coating in accordance with the invention. Cleaning can take place by methods known to the skilled worker, using customary cleaning agents.

In the process of the invention for applying integrated pretreatment layers the surface of the metal is treated with the formulation, by spraying, dipping or rolling, for example. After a dipping operation excess treatment solution can be removed from the workpiece by allowing it to drip dry; in the case of metal sheets, metal foils or the like, excess treatment solution can alternatively be removed by squeezing off or squeegeeing, for example. In the course of the treatment, parts at least of the polymer used, and also further components of the formulation, are chemisorbed by the surface of the metal, so that a solid bond comes about between the surface and the components. Treatment with the formulation takes place generally at room temperature, although this is not intended to rule out the possibility of higher temperatures in principle.

The treatment can be what is called a no-rinse operation, in which the treatment solution is dried directly in a drying oven immediately following its application, without rinsing. It is also possible, however, to rinse the surface, after treatment, with a cleaning fluid.

In the case of the particularly preferred coating of metal coils, coating may be performed both on one side and on both sides. With very particular preference coating takes place by means of a continuous process.

Coil coating may be performed, for example, by means of a continuously operating coil coating plant, as described in Römpp Lexikon Lacke und Druckfarben, Georg Thieme Verlag, Stuttgart, N.Y., 1998, page 55, "Coil coating", or in German patent application DE 196 32 426 A 1. It will be appreciated that plants of other construction can also be used.

The speed of the metal coil is selected by the skilled worker in accordance with the application and curing properties of the formulation employed. Speeds which have proven appropriate are in general from 10 to 200 m/min, preferably from 12 to 120 m/min, more preferably from 14 to 100 m/min, very preferably from 16 to 80 and in particular from 20 to 70 m/min.

The coating materials of the invention can be applied in any way, by spraying, flowcoating or roll coating, for example. Among these application techniques, roll coating is particularly advantageous and is therefore used with preference in accordance with the invention.

Each application step in roll coating can be conducted with two or more rolls. Preference is given to employing from two to four rolls, and especially two rolls.

In roll coating, the rotating pick-up roll dips into a reservoir of the coating material of the invention and so picks up the coating material that is to be applied. This material is transferred from the pick-up roll to the rotating application roll directly or via at least one transfer roll. The coating material is stripped from this application roll and so transferred to the coil as it runs in the same or opposite direction.

As an alternative, the coating material of the invention can also be pumped directly into a gap or nip between two rolls, this being referred to by those in the art as nip feed.

In accordance with the invention, transfer by reverse stripping, or the reverse roller coating technique, is of advantage and is therefore employed with preference.

In roll coating, the circumferential speeds of the pick-up roll and the application roll may vary greatly from one coating operation to another. The application roll preferably has a circumferential speed which is from 110 to 125% of the coil speed, and the pick-up roll a circumferential speed which is from 20 to 40% of the coil speed.

Following the application of the formulation used in accordance with the invention, any solvent present in the layer is removed and the layer is crosslinked. This can take place in two separate steps, but can also take place simultaneously. To remove the solvent, the layer is preferably heated by means of an appropriate apparatus. Drying can also take place by contacting with a stream of gas. The two methods can be combined.

The curing method is guided by the nature of the crosslinker and as a general rule takes place thermally. However, it is also possible to cure with actinic radiation or through a combination of thermal curing and actinic radiation curing. Joint curing with heat and actinic radiation is also referred to by those in the art as dual cure. Actinic radiation here and below means electromagnetic radiation, such as near infrared, visible light, UV radiation or X-rays, especially UV radiation, or corpuscular radiation, such as electron beams.

The temperature required for curing is guided in particular by the crosslinker used. Highly reactive crosslinkers can be cured at lower temperatures than crosslinkers of relatively low reactivity. The temperature of the layer for curing is normally between 120 and 250° C.

Heating of the coating films of the invention in the case of thermal curing takes place preferably by convection heat transfer, irradiation with near or far infrared and/or, in the case of iron-based coils, by electrical induction.

The heating time, i.e., the duration of the thermal cure, varies depending on the coating material of the invention that is employed. The time is preferably from 10 s to 2 min. Where essentially convection heat transfer is employed, the need is for forced-air ovens with a length of from 30 to 50 m, in particular from 35 to 45 m, at the preferred coil speeds. The forced-air temperature is of course higher than the temperature of the layer, and can be up to 350° C.

The thermal cure of the coating films of the invention can be assisted further by exposure to actinic radiation.

Curing, however, can also take place with actinic radiation alone, as described for example in German patent application DE 198 35 206 A 1.

The process of the invention allows an integrated pretreatment layer to be obtained on a metallic surface, particularly the surface of iron, steel, zinc or zinc alloys, aluminum or aluminum alloys. The exact structure and composition of the integrated pretreatment layer is not known to us. It comprises, besides the reaction products of the polymer and also of the crosslinker, the fillers, thioamide and, optionally, further components. In addition there may also be components present that have been extracted from the metal surface and deposited again, such as customary amorphous oxides of aluminum or of zinc and also, if appropriate, of other metals. The composition of the passivating layer appears not to be homogeneous but instead to exhibit concentration gradients.

The thickness of the integrated pretreatment layer is laid down by the skilled worker in accordance with the desired properties of the layer. In general a thickness of from 3 to 15 μm has been found appropriate, although in special cases the thicknesses may also be situated outside of these ranges. Preference is given to a thickness of from 4 to 10 μm and in particular from 5 to 8 μm. The thickness depends on the quantity of the composition applied in each case.

Atop the metallic surface with an integrated pretreatment layer it is possible for further coating layers to be applied.

This can be done in the same coil coating plant, in which two or more application stations and, if appropriate, curing stations are arranged in series. Alternatively, however, after the integrated pretreatment has been applied and cured, the coated coil can be wound up again and further layers applied in other plants. After the coated coils have been produced the coils for coating can be wound and then processed further at another place; alternatively they can be processed further as they come directly from coil coating. For instance, they can be laminated with plastics or provided with removable protective films.

The coils provided with the integrated pretreatment layer can also, however, first be reduced in size, without further coating, and processed further to shaped parts. Different shaped parts can also be assembled by welding. Examples of suitable shaping methods include pressing and deep drawing.

The resultant profile elements and shaped parts are scratch-resistant, stable to corrosion, stable to weathering and stable to chemicals, and can be overcoated readily with any of a very wide variety of coating materials.

The coating material without conductive pigments can be used as a substitute for cathodic electrocoat if it is employed in a layer thickness of about 10-15 μm.

Similarly, corrosion control layers applied by painting can be recoated with further coating layers.

The examples below are intended to illustrate the invention.

Base Formula for (Organic) Coil Coating Material Based on Epoxy Binders

For the formulation for producing an integrated pretreatment layer the following components were used:

| Component | Description | Amount [parts by weight] |
|---|---|---|
| Binder containing crosslinking groups | Epoxy binder based on bisphenol A (molecular weight 1000 g/mol, viscosity 13 dPas/s and 50% solids content) | 26.9 |
| Fillers | Hydrophilic pyrogenic silica (Aerosil ® 200V, Degussa) | 0.16 |
| | Talc Finntalk M5 | 2.9 |
| | White pigment titanium rutile 2310 | 10.8 |
| | Silica modified with calcium ions (Shieldex ®, Grace Division) | 3.0 |
| | Zinc phosphate (Sicor ® ZP-BS-M, Waardals Kjemiske Fabriken) | 4.1 |
| | Black pigment (Sicomix ® Schwarz, BASF AG) | 1.0 |
| Solvent | Butylglycol | 5.0 |

The components were mixed in the order stated in a suitable stirring vessel and predispersed with a dissolver for ten minutes. The resulting mixture was transferred to a bead mill with cooling jacket and mixed with 1.8-2.2 mm-sized SAZ glass beads. The millbase was ground for 1 h 30 minutes. Subsequently the millbase was separated from the glass beads.

The millbase was admixed with stirring in the order stated with 5.9 parts by weight of a blocked hexamethylene diisocyanate (Desmodur® VP LS 2253 from Bayer AG) and 0.4 part by weight of a commercially customary tin-free crosslinking catalyst (Borchi® VP 0245 from Borchers GmbH).

Base Formula PU: Coil Coating Material (Aqueous) Based on Polyurethane Binder:

The binder used was an aqueous polyurethane dispersion (solids content 44% by weight, acid number 25, $N_n$ about 8000 g/mol, $M_w$ about 21000 g/mol) based on polyester diols as soft segment ($M_n$ about 2000 g/mol), 4,4'-bis(isocyanatocyclohexyl)methane, and also monomers containing acidic groups, and chain extenders.

In a suitable stirring vessel, in the order stated, 18.8 parts by weight of polyurethane dispersion, 4.5 parts by weight of dispersing additive, 1.5 parts by weight of a flow control agent with defoamer action, 5.5 parts by weight of a melamine resin crosslinker (Luwipal® 072, BASF AG), 0.2 part by weight of a hydrophilic pyrogenic silica (Aerosil® 200V from Degussa), 3.5 parts by weight of Finntalc M5 talc, 12.9 parts by weight of titanium rutile 2310 white pigment, 8.0 parts by weight of the polyurethane dispersion, 3.5 parts by weight of silica modified with calcium ions (Shieldex®) from Grace Division), 4.9 parts by weight of zinc phosphate (Sicor® ZP-BS-M from Waardals Kjemiske Fabriken), 1.2 parts by weight of black pigment (Sicomix® Black from BASF AG) were mixed and the mixture was predispersed with a dissolver for ten minutes. The resulting mixture was transferred to a bead mill with cooling jacket and mixed with 1.8-2.2 mm SAZ glass beads. The millbase was milled for 45 minutes. Subsequently the millbase was separated from the glass beads.

The millbase was admixed with stirring, in the order stated, with 27 parts by weight of the polyurethane dispersion, 1.0 part by weight of a defoamer, 3.2 percent of an acidic catalyst (blocked p-toluenesulfonic acid, Nacure® 2500), 1.5 parts by weight of a defoamer, and 1.0 part by weight of a flow assistant.

Inventive Examples 1 to 5

Comparative Examples 1 to 3

The base formula was admixed additionally in each case with 3 parts by weight in each case of one of the thioamides for use in accordance with the invention, containing at least two thioamide groups, or with a polymeric thioamide. The thioamides used are compiled in Table 1.

Additionally synthesized were the following polymeric thioamides:

Polymeric Thioamide A

The starting material used for the synthesis was a commercial copolymer of 75% by weight styrene and 25% by weight acrylonitrile (Luran® 358 N, BASF AG).

In a 2 l pilot stirrer with anchor stirrer and internal thermometer, 150 g of the starting material were dissolved in 160 g of tetrahydrofuran and 150 g of methanol at 50° C. This gives a clear polymer solution having a solids content of 34.8%.

A pressure vessel was charged at room temperature with 102.5 g of said polymer solution and 12.5 g of diethylamine in 60 ml of tetrahydrofuran. Then 6 g of hydrogen sulfide were injected. The reaction mixture was heated to 60° C. and stirred for 4 hours. After the vessel has been let down, the polymer solution obtained is concentrated at approximately 650-500 mbar and 50° C. to 118.2 g. Then a further 106 g of tetrahydrofuran are added and concentration takes place again at about 650-500 mbar and 50° C. to 112.2 g. This gives a clear, brown polymer solution having a solids content of 32.5%. The degree of conversion of CN to CSNH2 was determined as being 45%, by means of a quantitative $^{13}C$ NMR spectrum.

Polymeric Thioamide B

The starting material synthesized was a non-modified copolymer of maleic anhydride, n-dodec-1-ene, and a mixture of different $C_{20-24}$ olefins (quantitative ratio 1/0.6/0.4), in accordance with the following instructions:

In a 1500 l pressure reactor with anchor stirrer, temperature monitoring, and nitrogen inlet, 36.96 kg of $C_{20-24}$ olefin are pumped in at 60° C. and 31.48 kg of n-dodec-1-ene are drawn in under suction. The initial charge is heated to 150° C. Then feed stream 1, consisting of 1.03 kg of di-tert-butyl peroxide, and feed stream 2, consisting of 30.57 kg of melted maleic anhydride, are metered in over the course of 6 hours. After the end of feed streams 1 and 2 the batch is stirred at 150° C. for 2 hours. Subsequently, acetone and tert-butanol are moved by distillation under 150-200 mbar.

This starting material was reacted with hydroxypropionic thioamide.

A 2 L pilot stirrer with anchor stirrer and internal thermometer is gassed with 120.7 g of maleic anhydride/$C_{12}$ olefin/ $C_{20-24}$ olefin (1/0.6/0.4) and 40.0 g of hydroxypropionic thioamide, nitrogen is introduced, and the batch is stirred at 10° C. for 1 hour. Then 17.8 g of dioxane are added and stirring is continued for 4 hours. The batch is then diluted to 50% using 142.9 g of methyl ethyl ketone. This gives a clear, brown polymer solution having a solids content of 49.1%. The progress of the reaction was monitored by means of IR spectroscopy. Over the course of time the anhydride double bands (1835 and 1735 cm$^{-1}$) were observed to decrease, and the increase of two bands was observed, these bands being assigned to the ester group of the reaction product (1708 cm$^{-1}$) and the carboxylic acid group formed (1777 cm$^{-1}$). At the end of the reaction time it was no longer possible to detect an anhydride double band.

For comparison purposes, one base formula was left without any addition, and, moreover, a compound containing a thioamide group but no functional group was tested, as was a dithiocarbamate.

TABLE 1

Thioamides used for the experiments

| Example | Coating material | Thioamide |
| --- | --- | --- |
| Inventive 1 | E | Dithioadipamide |
| Inventive 2 | E | 7-Hydroxythioheptanamide |
| Inventive 3 | E | 3-Hydroxythiopropionamide |
| Inventive 4 | E | Polymeric thioamide A (styrene-acrylic thioamide) |
| Inventive 5 | P | Polymeric thioamide B |
| Comparative 1 | E | None |
| Comparative 2 | E | 3-Phenylthiopropionamide |
| Comparative 3 | E | Dithiocarbamate 1,13-bis(dithiocarbamoyl)-4,7,10-trioxatridecane |

Key:
E: Coating material based on epoxy binder
P: Coating material based on polyurethane binder Application of the Integrated Pretreatment Layers of the Invention The compositions were applied using rod-type doctor blades to steel plates of type Z (OEHDG 2 from Chemetall) and to aluminum plates AlMgSi (AA6016 from Chemetall) in a wet-film thickness which resulted, after curing in a continuous dryer at a forced-air temperature of 185° C. and a substrate temperature of 171° C., in coatings with a dry layer thickness of 6 μm.

Testing of the Coatings
Testing of the Steel Panels:

With steel plates a standardized 10-week test under alternating conditions was carried out (VDA [German automakers association] alternating-conditions test; VDA test sheet 621-415 February 82).

After the end of corrosion exposure, the panels were evaluated visually. Assessments were made both of the formation of corrosion products on the undamaged coating area, and of the propensity for subfilm corrosion at the edge and at the scribe mark.

In this evaluation the following scores were awarded:
0=corrosion damage as in the case of the blank sample
+=less corrosion damage than in the case of the blank sample
++=substantially less corrosion damage than in the case of the blank sample Testing of the Aluminum Panels:

On aluminum plates the acetic acid salt spray test ASS (DIN 50021 June 88) was carried out. After the end of corrosion exposure, the panels were evaluated visually. In this case evaluation covered the circular delamination over the entire coating area.

In this evaluation the following scores were awarded:
0=corrosion damage as in the case of the blank sample
+=less corrosion damage than in the case of the blank sample
++=substantially less corrosion damage than in the case of the blank sample The results of the tests are compiled in Table 2:

TABLE 2

Compilation of the results of the corrosion control tests

| Formulation of | Inhibitors | Coating Material | Evaluation on steel | Evaluation on aluminum |
| --- | --- | --- | --- | --- |
| Inventive example 1 | Dithioadipamide | E | ++ | ++ |
| Inventive example 2 | 7-Hydroxyheptanethioamide | E | ++ | 0 |
| Inventive example 3 | 3-Hydroxythiopropionamide | E | + | ++ |
| Inventive example 4 | Polymeric thioamide A | E | ++ | ++ |
| Inventive example 5 | Polymeric thioamide B | PU | 0 | ++ |
| Comparative example 1 | None | E | 0 | 0 |
| Comparative example 2 | 3-Phenylthiopropionamide | E | 0 | 0 |
| Comparative example 3 | Dithiocarbamate | E | 0 | 0 |

The inventive and comparative examples show that the thioamides D1 and/or D2 used in accordance with the invention yield better results in integrated pretreatment layers than do other thioamides and other thiocarbonyl compounds.

The invention claimed is:

1. A process for applying a corrosion preventive layer to a metallic surface comprising treating said surface with a formulation comprising a binder, a pigment and/or a filler and a corrosion preventive agent, wherein said corrosion preventive agent is at least one compound containing thioamide groups of the general formula (I) —C(S)NR$^1$R$^2$, selected from the group of
(D1) thioamides of the general formula (II) R$^4_n$—R$^3$—C(S)NR$^1$R$^2$, and
(D2) thioamides containing at least 2 thioamide groups, wherein n is a natural number from 1 to 5, and the radicals R$^1$, R$^2$, R$^3$ and R$^4$ have the following definitions:
R$^1$ and R$^2$ each independently are H or a linear or branched, optionally substituted, alkyl radical having 1 to 20 carbon atoms,
R$^3$ is an (n+1)-valent hydrocarbon radical having 1 to 30 carbon atoms, and
R$^4$ is a functional group.

2. The process according to claim 1, wherein R$^1$ and R$^2$ are H.

3. The process according to claim 1, wherein the functional group R$^4$ is a group comprising O and/or N atoms.

4. The process according to claim 1, wherein (D2) is a thioamide of the general formula (III) R$^1$R$^2$N(S)C—R$^7$—C(S)NR$^1$R$^2$, wherein R$^7$ is a divalent linking group having 1 to 30 carbon atoms and optionally comprising additional functional groups.

5. The process according to claim 4, wherein the group R$^7$ has one or two carbon atoms.

6. The process according to claim 1, wherein (D2) is a polymer which comprises at least two terminal and/or pendant thioamide groups —C(S)NR$^1$R$^2$.

7. The process according to claim 1, wherein the metallic surface prior to treatment with the formulation is cleaned in an additional cleaning step.

8. The process according to claim 1, wherein the metallic surface is a surface of steel, zinc or zinc alloys, aluminum or aluminum alloys.

9. The process according to claim 1, wherein treatment is by rolling, spraying or dipping.

10. The process according to claim 1, wherein the metal surface is the surface of a coil metal.

11. The process according to claim 10, wherein the coil metal is electrolytically galvanized or hot-dip-galvanized steel.

12. The process according to claim 10, wherein treatment is by means of a continuous process.

13. The process according to claim 1, wherein the formulation is a non-aqueous formulation.

14. The process according to claim 1, wherein the corrosion preventive agent comprises a thioamide (D1) having functional groups containing (i) only N and O heteroatoms and/or (ii) a nitrile group.

15. The process according to claim 1, wherein the formulation comprises a polythioamide polymer having a $M_n$ of from 1,000 to 100,000 g/mol.

16. The process according to claim 1, wherein the formulation comprises a thioamide (D1) in which the $R^3$ group is a 1,4-phenylene group.

17. The process according to claim 1, wherein the formulation comprises a thioamide (D1) selected from the group consisting of 2-hydroxythioacetamide, 3-hydroxythiopropionamide, 4-hydroxythiobutanamide, 5-hydroxythiopentanamide, 7-hydroxythioheptanamide, 8-hydroxythiooctanamide, 9-hydroxythiononamide and 10-hydroxythiodecanamide.

18. The process according to claim 1, wherein the formulation is an aqueous dispersion.

19. The process according to claim 1, wherein the formulation comprises one or more thioamides of the formula $R^4{}_n$—$R^3$—$C(S)NR^1R^2$ wherein the $R^4$ functional group is at least one selected from the group consisting of —OH and —$NH_2$.

20. The process according to claim 19, wherein the formulation is an aqueous dispersion of the corrosion preventive agent.

21. A process for applying an integrated pretreatment layer to a metallic surface, comprising the steps of
 (1) treating the metallic surface with a crosslinkable formulation comprising at least
  (A) a binder,
  (B) crosslinkable components, which can be crosslinkable groups connected to the binder and/or can be at least one additionally employed crosslinker,
  (C) a pigment and/or filler,
  (D) a corrosion preventative, and
  (E) optionally a solvent, and
 (2) crosslinking the applied layer,
 wherein
 the amount of binder is from 20 to 70% by weight,
 the filler comprises from 20 to 70% by weight of at least one finely divided inorganic filler having an average particle size of less than 10 μm, and
 the corrosion preventative comprises from 0.25 to 10% by weight of at least one compound containing thioamide groups of the general formula (I) —$C(S)NR^1R^2$ and selected from the group consisting of
  (D1) thioamides of the general formula (II) $R^4{}_n$—$R^3$—$C(S)NR^1R^2$, and
  (D2) thioamides containing at least 2 thioamide groups,
 wherein n is a natural number from 1 to 5 and the radicals $R^1$, $R^2$, $R^3$ and $R^4$ have the following definitions:
  $R^1$ and $R^2$ independently of one another are H or a linear or branched, optionally substituted, alkyl radical having 1 to 20 carbon atoms,
  $R^3$ is an (n+1)-valent hydrocarbon radical having 1 to 30 carbon atoms, and
  $R^4$ is a functional group,
 with the proviso that the percentages by weight are based on the sum of all of the components bar the solvent.

22. The process according to claim 21, wherein said integrated pretreatment layer has a thickness of from 3 to 15 μm.

23. The process according to claim 21, wherein the formulation is a non-aqueous formulation.

24. The process according to claim 21, wherein the corrosion preventive agent comprises a thioamide (D1) having functional groups containing (i) only N and O heteroatoms and/or (ii) a nitrile group.

25. The process according to claim 21, wherein the formulation comprises a polythioamide polymer having a $M_n$ of from 1,000 to 100,000 g/mol.

26. The process according to claim 21, wherein the formulation comprises a thioamide (D1) in which the $R^3$ group is a 1,4-phenylene group.

27. A formulation for applying a corrosion preventive layer to a metallic surface, comprising at least one binder, one pigment and/or one filler and one corrosion preventive agent, wherein said corrosion preventive agent is a compound containing at least one thioamide group of the general formula (I) —$C(S)NR^1R^2$, selected from the group of
 (D1) thioamides of the general formula (II) $R^4{}_n$—$R^3$—$C(S)NR^1R^2$, and
 (D2) thioamides containing at least 2 thioamide groups,
 wherein n is a natural number from 1 to 5, and the radicals $R^1$, $R^2$, $R^3$ and $R^4$ have the following definitions:
  $R^1$ and $R^2$ each independently are H or a linear or branched, optionally substituted, alkyl radical having 1 to 20 carbon atoms,
  $R^3$ is an (n+1)-valent hydrocarbon radical having 1 to 30 carbon atoms, and
  $R^4$ is a functional group.

28. A formulation for applying integrated pretreatment layers to metallic surfaces, comprising the following components:
 (A) a binder,
 (B) crosslinkable components, which can be crosslinkable groups connected to the binder and/or can be at least one additionally employed crosslinker,
 (C) a pigment and/or filler,
 (D) a corrosion preventative, and
 (E) optionally a solvent,
 wherein
 the amount of the binder is from 20 to 70% by weight,
 the filler comprises from 20 to 70% by weight of at least one finely divided inorganic filler having an average particle size of less than 10 μm, and
 the corrosion preventative comprises from 0.25 to 10% by weight of at least one compound containing thioamide groups of the general formula (I) —$C(S)NR^1R^2$ and selected from the group consisting of
  (D1) thioamides of the general formula (II) $R^4{}_n$—$R^3$—$C(S)NR^1R^2$, and
  (D2) thioamides containing at least 2 thioamide groups,
 wherein n is a natural number from 1 to 5 and the radicals $R^1$, $R^2$, $R^3$ and $R^4$ have the following definitions:

$R^1$ and $R^2$ independently of one another are H or a linear or branched, optionally substituted, alkyl radical having 1 to 20 carbon atoms, $R^3$ is an (n+1)-valent hydrocarbon radical having 1 to 30 carbon atoms, and $R^4$ is a functional group, the percentages by weight being based on all of the components bar the solvent.

* * * * *